(12) United States Patent
Berkey et al.

(10) Patent No.: US 7,915,849 B2
(45) Date of Patent: Mar. 29, 2011

(54) METHOD AND SYSTEM FOR LOW SPEED CONTROL OF A VIDEO SURVEILLANCE SYSTEM MOTOR

(75) Inventors: Thomas F. Berkey, Tavernier, FL (US); Carlos DeJesus, Boynton Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 541 days.

(21) Appl. No.: 11/950,809

(22) Filed: Dec. 5, 2007

(65) Prior Publication Data

US 2008/0138049 A1 Jun. 12, 2008

Related U.S. Application Data

(60) Provisional application No. 60/873,379, filed on Dec. 7, 2006.

(51) Int. Cl.
*G05B 19/29* (2006.01)
(52) U.S. Cl. ........................................ 318/602; 318/610
(58) Field of Classification Search .................. 318/610, 318/602
See application file for complete search history.

(56) References Cited

U.S. PATENT DOCUMENTS

| 4,344,127 A | 8/1982 | McDaniel et al. | |
| 6,049,075 A | 4/2000 | Nakayama | |
| 7,245,103 B2 * | 7/2007 | Chapman et al. | 318/651 |
| 7,417,400 B2 * | 8/2008 | Takeishi et al. | 318/599 |
| 7,633,256 B2 * | 12/2009 | Reichert et al. | 318/602 |

FOREIGN PATENT DOCUMENTS

EP 0525482 A2 2/1993

OTHER PUBLICATIONS

International Search Report and Written Opinion dated Oct. 15, 2008 for International Application No. PCT/US2007/025018, International Filing Date Dec. 6, 2007 (15-pages).

* cited by examiner

*Primary Examiner* — Bentsu Ro
*Assistant Examiner* — Erick Glass
(74) *Attorney, Agent, or Firm* — Christopher & Weisberg, P.A.

(57) ABSTRACT

The present invention provides a method and system that improve the low-speed control stability of a video camera assembly, including a video camera, a tilt motor operable to tilt the video camera and a pan motor operable to pan the video camera. A first encoder is coupled to one of the tilt motor and pan motor. The first encoder outputs a plurality of signals having corresponding signal edges, based on a rotation speed of the one of the tilt motor and pan motor. A first controller is in electrical communication with the first encoder. The first controller determines a speed of the one of the tilt motor and pan motor at least in part by correlating a time period between detection of the first edge and detection of the second edge to the speed of the at least one tilt motor and pan motor.

9 Claims, 9 Drawing Sheets

METHOD AND SYSTEM FOR LOW SPEED CONTROL OF A VIDEO SURVEILLANCE SYSTEM MOTOR

CROSS-REFERENCE TO RELATED APPLICATION

This application is related to and claims priority to U.S. Provisional Patent Application Ser. No. 60/873,379, filed Dec. 7, 2006, entitled Video Dome and System, the entirety of which is incorporated herein by reference.

STATEMENT REGARDING FEDERALLY SPONSORED RESEARCH OR DEVELOPMENT n/a

FIELD OF THE INVENTION

The present invention relates to a video camera control system, and in particular, a system for controlling the movement of a video dome and a method of use thereof.

BACKGROUND OF THE INVENTION

Video camera lens systems continue to evolve, such that they have higher and higher zoom factors. When using the higher zoom factors it is desirable to control the pan and tilt speeds of video dome systems at an inversely-proportional rate, i.e., slower speeds in order to follow distant objects. Methods to control motor speed with a combination of proportional, integral and derivative terms ("PID") for video surveillance systems are known.

Now referring to FIG. 1, a block diagram illustrating a typical PID-controlled system of the prior art, generally designated as "10", is shown. In this type of control system, the Proportional, Integral and Derivative error terms are summed to derive an output value to control a voltage level or Pulse Width Modulated ("PWM") signal which drives a DC motor 12 coupled to a gear assembly 14, which then drives a pan platform 16. The speed error value used in such a PID control system is typically calculated by subtracting the measured speed from the commanded or desired speed. The proportional term is calculated by multiplying the speed-error times a proportional constant. The derivative term is calculated by multiplying the change-in-speed-error times a derivative constant. Change-in-speed-error is the current speed error minus the previous speed error. If the speed error has not changed, the derivative term will be zero.

When the error goes from zero to a positive value, the proportional and derivative terms can add to nearly twice that of the proportional term alone. This gives the circuit a faster response when the error is increasing. Similarly, if the error is cut to half the previous value, the derivative term will be negative while the proportional is still positive and the two can nearly cancel each other out. In this condition, the derivative term is reducing the effect of the proportional term when the speed is approaching the commanded speed and the error is decreasing.

The integral term may be calculated by multiplying the speed-error times an integral constant and adding that to an accumulator. The integral constant is usually much lower than the proportional or derivative constants, such that the integral accumulation slowly ramps up or down to remove any steady state error that the proportional or derivative terms cannot compensate for. The steady state speed will be controlled entirely by the integral term, because when the speed is equal to the commanded speed, the error is zero and both the proportional and derivative terms will become zero. The integral term will be just large enough to compensate for steady state load. The speed error calculator subtracts the measured speed from the commanded speed and feeds the speed error to the PID controller.

It is also common practice to use an encoder/sensor 18 to detect or measure incremental change in rotational position. An encoder, also called a rotary or shaft encoder, is an electromechanical device used to convert the angular position and thus movement of a shaft or axle to an analog or digital code, as known in the art and described in more detail below. In these systems, the number of quadrature cycles per given time period is proportional to the speed. The pulse stream from the encoder 18 is converted to a speed measurement to monitor or otherwise update the actual movement of the device, which may be at a rate of every 10 ms or so. As shown in FIG. 1, the encoder/sensor 18 detects or measures incremental change in rotational position of the motor 12 and/or gear box 14. The sensor or encoder 18 typically includes two pulse stream outputs: commonly labeled Ch. A and Ch. B. The two pulse streams are designed to be +90° or −90° out of phase with respect to each other depending on whether the encoders are rotating in one direction or the other. FIG. 2 illustrates a waveform having a 90° phase difference between the two channels. These illustrated signals are decoded (i.e., into a binary output of 1 or 0, for example) to produce a count up pulse or a count down pulse for a particular period or cycle time.

In order to achieve more accurate speed measurements from the encoder 18, it is also common practice to count all of the edges 20 from both channels over a given time period "t". In such systems, the number of quadrature cycles or edges per given time period is proportional to the speed (i.e., the encoder has a fixed, known number of cycles or increments per turn of the motor). Again referring to FIG. 1, the pulse stream output of the encoder 18 is converted to speed by a speed decoder 22, which may take into account the number of increments or edges per revolution of the motor 12 to produce a measured speed output. The speed decoder 22 then outputs the calculated speed value to a speed error calculator 24, which compares the speed measurement decoded from the encoder 18 and compares it to a speed input command 26. The speed error is then processed by a PID controller 28, which subsequently updates a PWM driver 30 at a typical period rate of every 10 ms or so to control or otherwise manipulate the performance of the motor 12.

To achieve an increasingly accurate control of speed and position, the encoder 18 is commonly coupled to a motor shaft of the motor 12 with the gear assembly 14 positioned between the motor shaft and the movable platform 16, as shown. The gear box 14 increases the number of pulses output from the encoder 18, directly proportional to the gear ratio and also allows a smaller torque motor to turn the platform. However, increasing the gear ratio reduces the maximum speed that can be achieved with the same RPM motor.

In a video dome system, another desirable mode of operation is to jump to a pre-determined position as fast as possible when a door alarm or motion detector goes off etc. If, for instance, a video surveillance system was required to go to any target from any position in less then a second, the gear box must have a limited gear ratio to allow the motor to ramp up to maximum speed, turn the platform 180°, and ramp back down to a stop at the target, all within 1 second. Installing a larger, higher speed, higher torque motor could improve high speed control while allowing a larger gear ratio, but the drive system would be larger and more costly.

It is difficult to achieve smooth control of a video camera platform below 1.0° per second when using a limited gearbox ratio, a limited motor size to reduce physical area and cost, and an encoder with a practical number of pulses per revolution. At very low speeds, there are so few pulses per second that the speed reading acquired in a 10 ms period is not very accurate. A second problem at very low speed occurs if there is a rough spot in the bearing or gear system, where the platform can go from 1°/sec to a stalled condition in less than 1 ms. Increasing the inertia of the platform with increased weight, similar to high end 33.3 RPM record players, will help smooth the low speed movement, but would require too much additional torque when accelerating to a distant target.

Common video surveillance motor control systems perform the PID calculations every 10 ms. The output value either controls the voltage fed to the motor or controls the pulse width of a fixed voltage, driving the motor. PWM systems are generally simpler and more efficient. The frequency of PWM systems used in video domes is commonly set at a fixed frequency where any noise generated does not interfere with the video signal, high enough to be at least several magnitudes above the time constant for the motor drive system and above the human audible level (>20 KHz). A PID calculation period of 10 ms and a 20 KHz PWM frequency results in 200 of the same width pulses to the motor between each calculation, which can result in significant discrepancies between the desired or commanded speed and the actual movement of the video system due to the latency in updating the calculation. Although the prior art is explained with reference to pan motor control, it is understood that prior art operation for tilt motor control is similar and is therefore not explained herein.

In view of the above, it is desirable to provide a low cost, effective video surveillance system having improved capabilities for low speed movement and control thereof.

SUMMARY OF THE INVENTION

In accordance with one aspect, the present invention advantageously provides a motor control system in which a first encoder outputs a plurality of signals having corresponding signal edges. The plurality of signals includes a first edge and a second edge and are based on the speed of a first motor. A first controller is in electrical communication with the first encoder. The first controller determines a speed of the first motor at least in part by correlating a time period between detection of the first edge and detection of the second edge to the speed of the first motor.

In accordance with another aspect, the present invention provides a method of controlling the movement of a video camera. A plurality of signals having corresponding signal edges corresponding to movement of a video camera motor are output. The plurality of signals include a first edge and a second edge. A speed of the video camera motor is determined at least in part by correlating a time period between detection of the first edge and detection of the second edge to the speed of the first video camera motor.

According to another aspect, the present invention provides a video surveillance system including a video camera, a tilt motor operable to tilt the video camera and a pan motor operable to pan the video camera. A first encoder is coupled to one of the tilt motor and pan motor. The first encoder outputs a plurality of signals having corresponding signal edges, based on a rotation speed of the one of the tilt motor and pan motor. A first controller is in electrical communication with the first encoder. The first controller determines a speed of the one of the tilt motor and pan motor at least in part by correlating a time period between detection of the first edge and detection of the second edge to the speed of the at least one tilt motor and pan motor.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
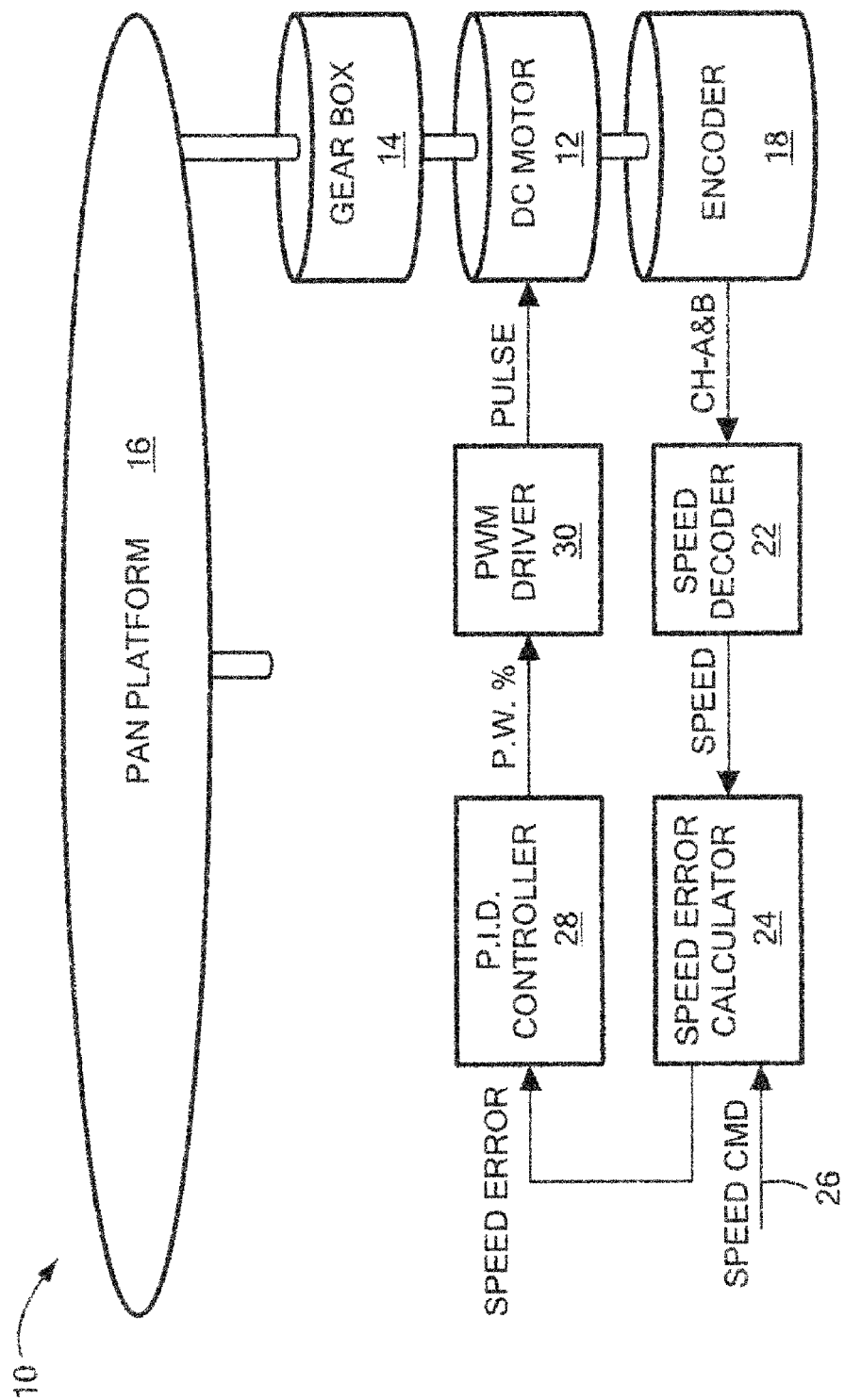
FIG. 1 is a block diagram of a video surveillance system of the prior art.
Figure 2:
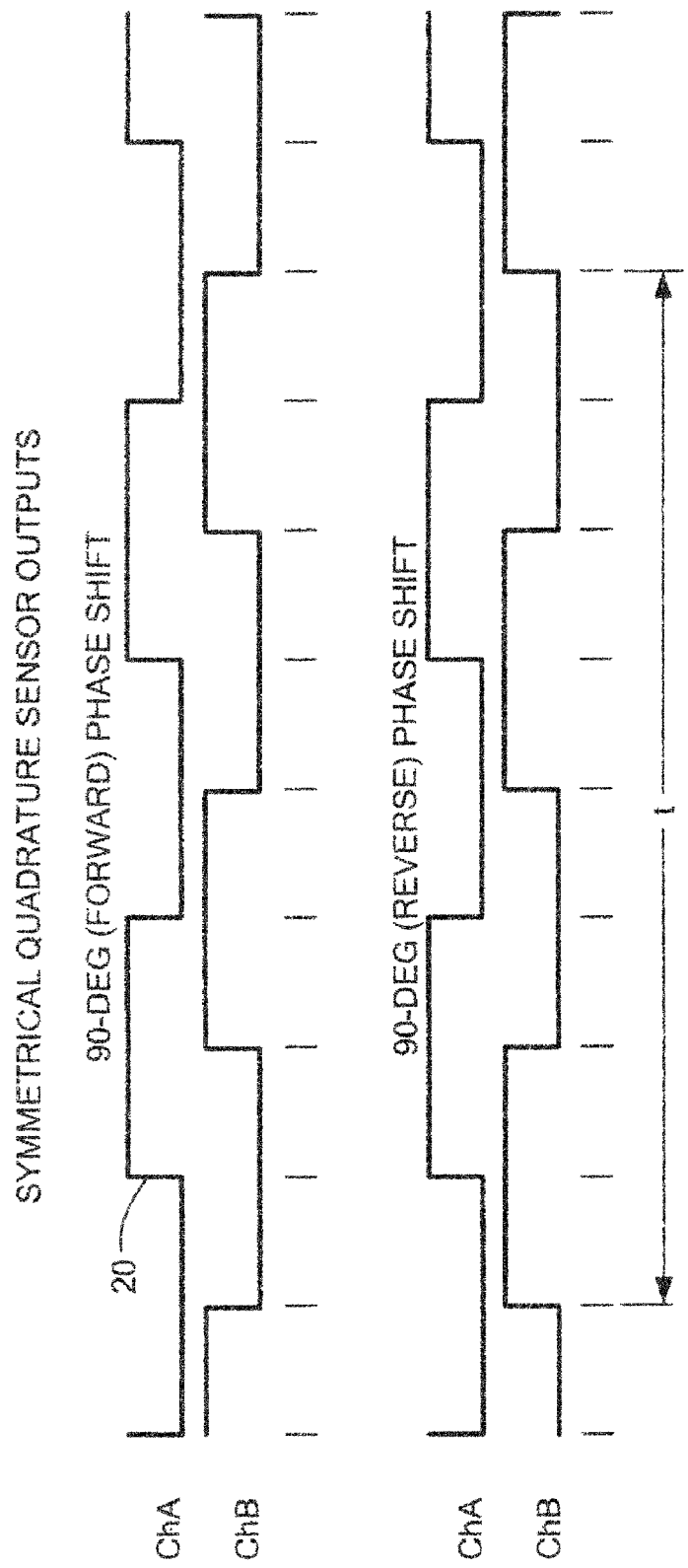
FIG. 2 is a wave form diagram of an output of a sensor and measurement thereof for a video surveillance system of the prior art.
Figure 3:
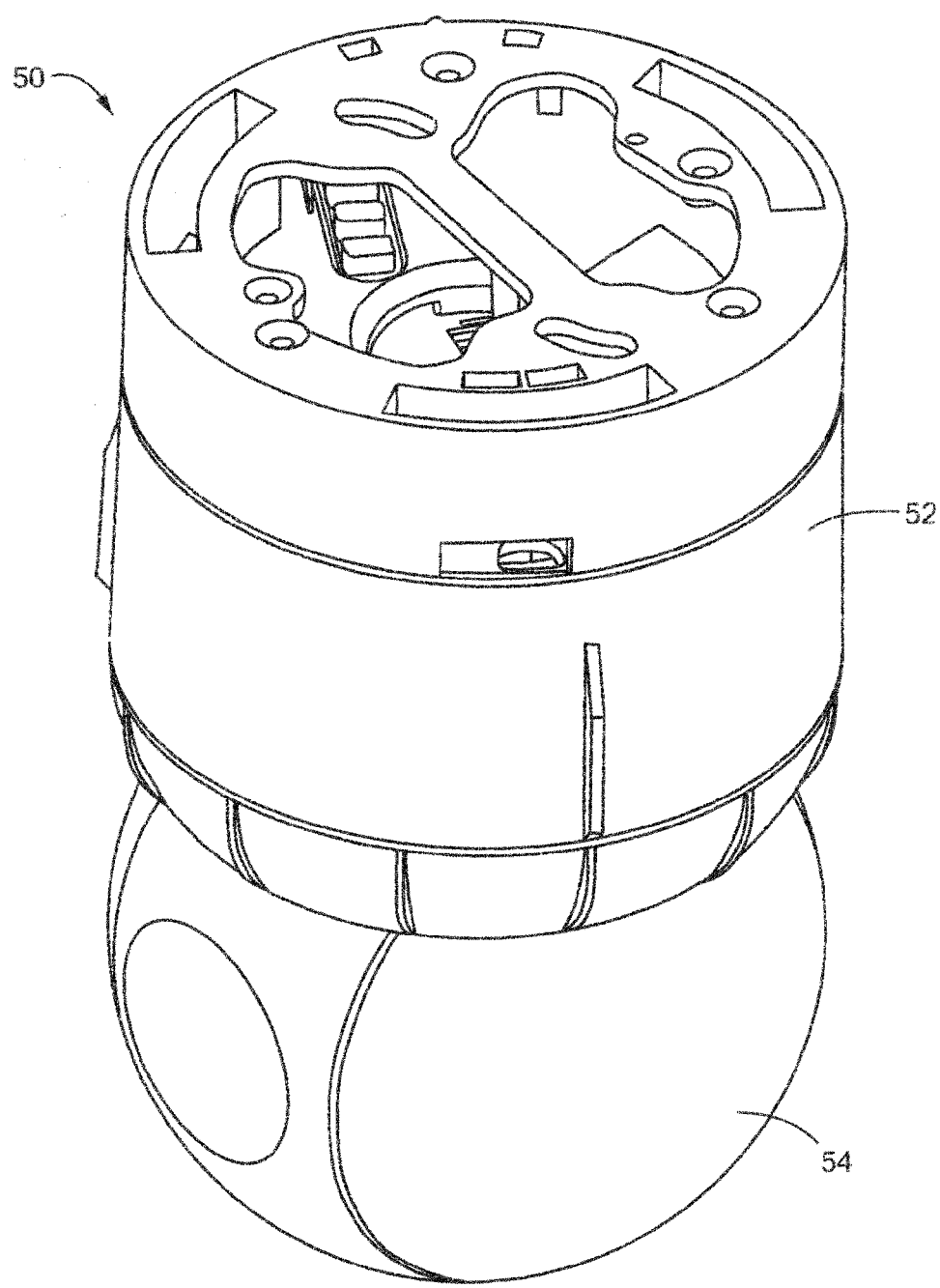
FIG. 3 is a perspective view of a video surveillance system constructed in accordance with the principles of the present invention.

The present invention provides a system and method for driving a video surveillance system. Referring now to the drawing figures in which like reference designators refer to like elements, there is shown in FIG. 3, a video surveillance system constructed in accordance with the principles of the present invention and designated generally as "50". The video surveillance system 50 may generally include a housing assembly 52 in operative communication with a camera assembly 54, each of which may contain various mechanical and electrical components facilitating the operation thereof.

Figure 4:
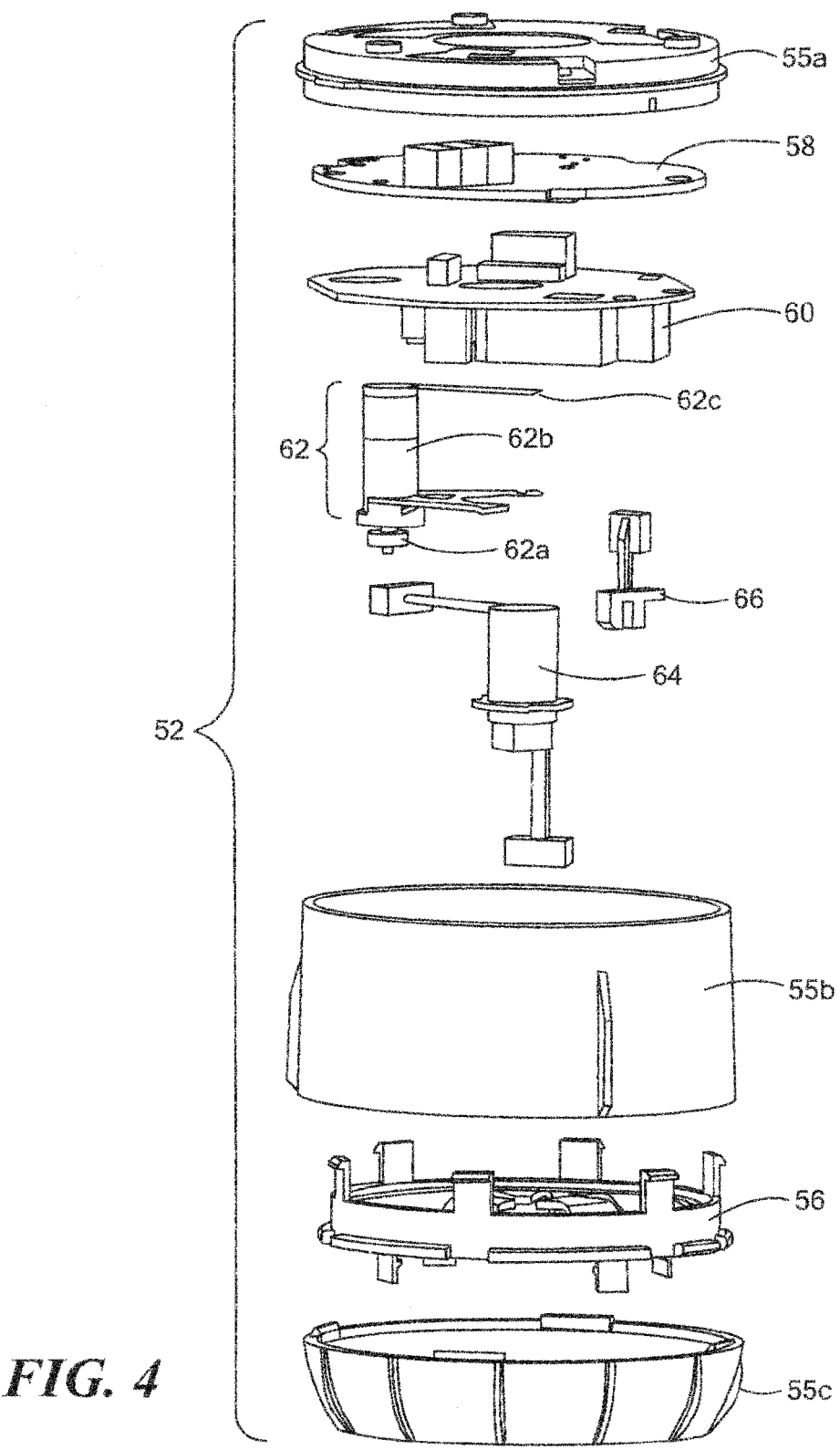
FIG. 4 is an exploded view of a housing assembly of the video surveillance system of FIG. 3.

Now referring to FIG. 4, in particular, the housing assembly 52 may include one or more housing elements 55a, 55b, 55c (referred to collectively herein as housing elements 55) encasing or otherwise enclosing a portion of the housing assembly contents. The housing elements 55 may be movably engaged to one another by a rotatable bearing pan platform 56 or similar mechanical coupling. The housing assembly 52 may further include a printed circuit ("PC") or CPU board 58 and a power supply 60 coupled to a pan motor 62. The CPU board 58 may include one or more processors, memory components, controllers, and/or a communications interface (not shown) for receiving, storing and/or executing commands or input from a remote location and for driving the pan motor 62. The power supply 60 may include a power source, such a battery or the like, and/or may further include electrical components for receiving and appropriately converting AC power from an external source to power the components described herein. The pan motor 62 may include a DC motor having the desired form factor and/or dimensions positionable within the housing assembly while having sufficient torque output to controllably move the desired components of the video surveillance system.

The housing assembly 52 of the video surveillance system 50 may further include a motor assembly 62 with a gear train 62a coupled to a motor 62b and an encoder 62c, where the motor assembly 62 imparts, transfers, or otherwise conveys the output of the motor 62b to additional portions of the video surveillance system 50 to produce the desired movement. In particular, the encoder 62c may include a mechanical or optical incremental rotary encoder, also known as a quadrature encoder or a relative rotary encoder, including two or more outputs (called quadrature outputs when they are 90 degrees out of phase) used to indicate movement of either the gear train 62a or the pan motor 62b, as discussed in more detail below. The movement indication can be used to determine the relative pan position of the camera assembly 54. In addition, a slip-ring assembly 64 may also be included in the housing assembly 52 and may further be coupled to the rotatable bearing pan platform 56 and housing element 55c to both provide an electrical connection to the pan platform, as well as enable the platform to move in an unlimited number of contiguous 360° revolutions. The housing assembly 52 may also include an optical sensor 66 for monitoring portions of the housing assembly 52 during operation.

Figure 5:
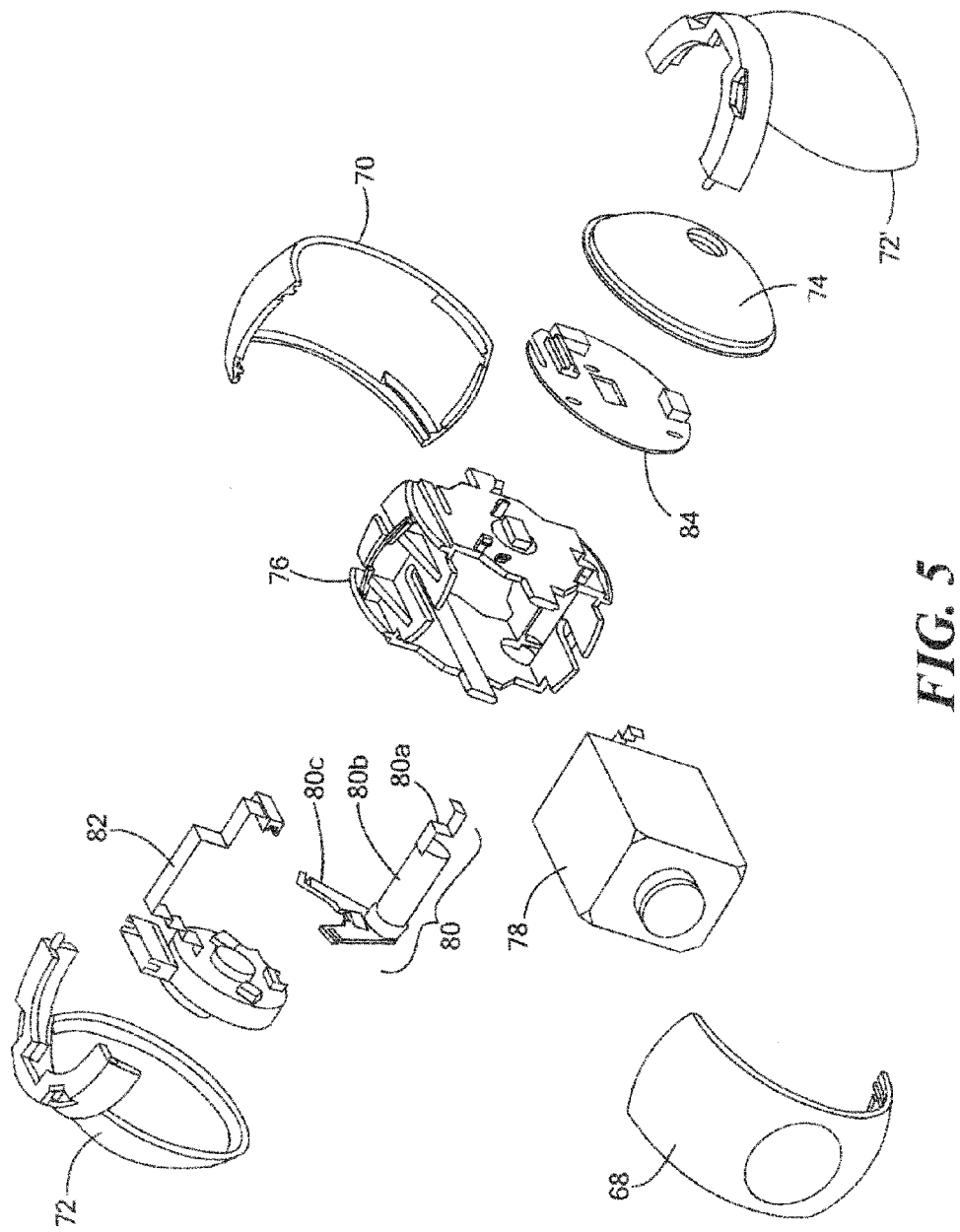
FIG. 5 is an exploded view of a camera assembly of the video surveillance system of FIG. 3.

As shown in FIG. 5, the camera assembly 54 of the video surveillance system 50 of the present invention may generally include one or more camera housing elements able to form a shell or cavity to contain or otherwise enclose additional components of the assembly. For example, there may be a front 68, rear 70, and two side 72, 72' camera housing elements engageable with one another, where one or more of the housing elements are rotatably or otherwise movably coupled to the others by a bearing component 74 and a tilt gear/bearing assembly 82. The camera assembly 54 may also include a camera cradle or yoke 76 able to receive a camera 78 securely therein. The camera 78 may include any device able to capture a visual image, including but not limited to color cameras, black and white cameras, digital capture devices, etc.

A tilt motor assembly 80 having a tilt encoder 80a, a tilt motor 80b, and a tilt gear train 80c, may be disposed within the camera assembly 54. In addition, a PC board 84 may also be included in the camera assembly 54 within the housing. The tilt motor 80b may be mechanically coupled to the camera cradle 76 for movement thereof, while the tilt encoder 80a may be similar to the pan encoder 62c described above with respect to the pan motor assembly 62, i.e., the encoder may include a mechanical or optical incremental rotary encoder for monitoring the rotation or movement of the tilt motor 80b. The PC board 84 may include one or more electrical components, processors, memory components, controllers, cable connectors and/or drivers (not shown) for receiving, storing, and/or conveying commands to and driving the tilt motor assembly 80, as well as for receiving, storing, and/or transmitting images generated by the camera 78.

Figure 6:
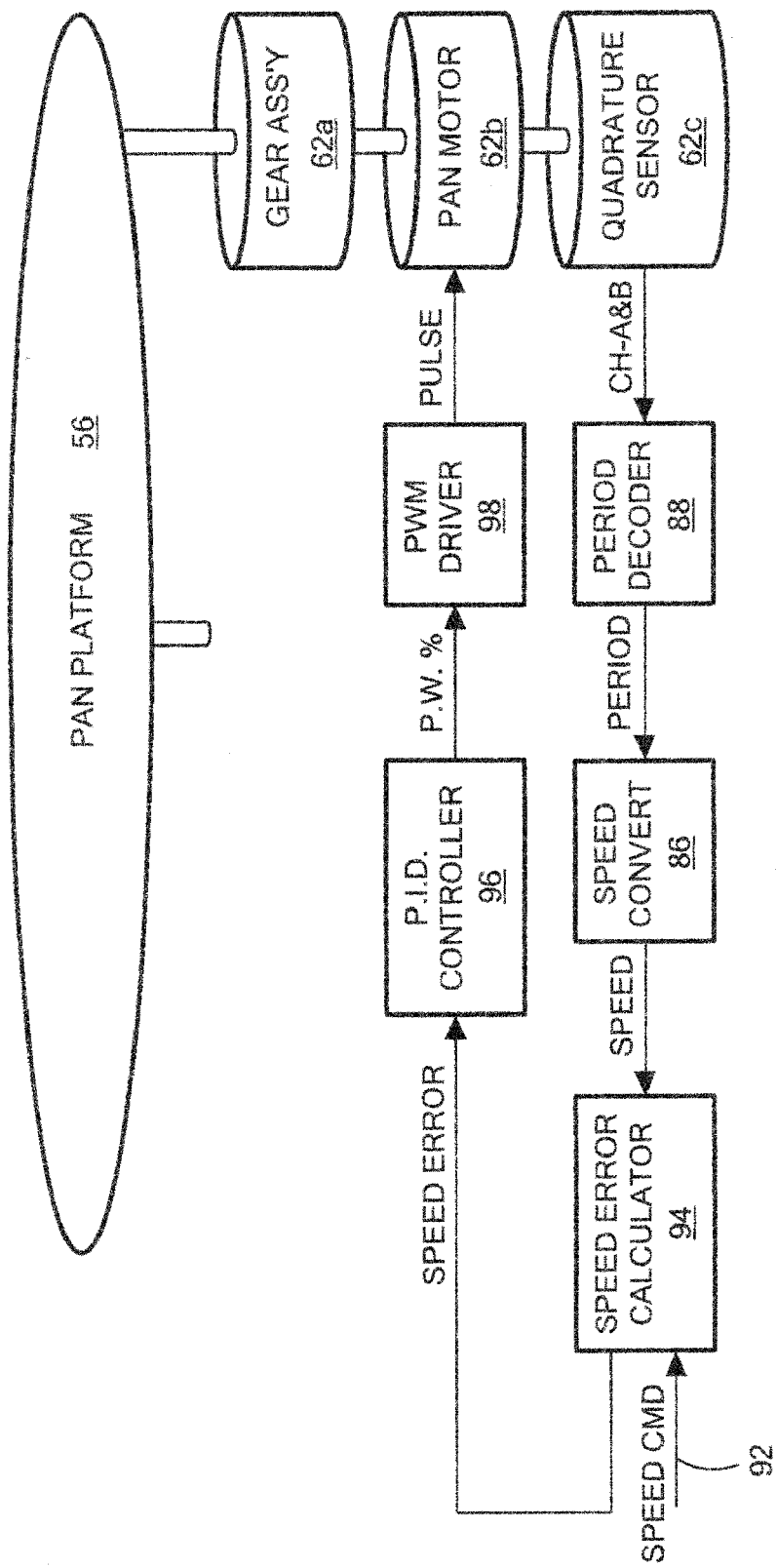
FIG. 6 is a block diagram of a video surveillance system constructed in accordance with the principles of the present invention.
Figure 7:
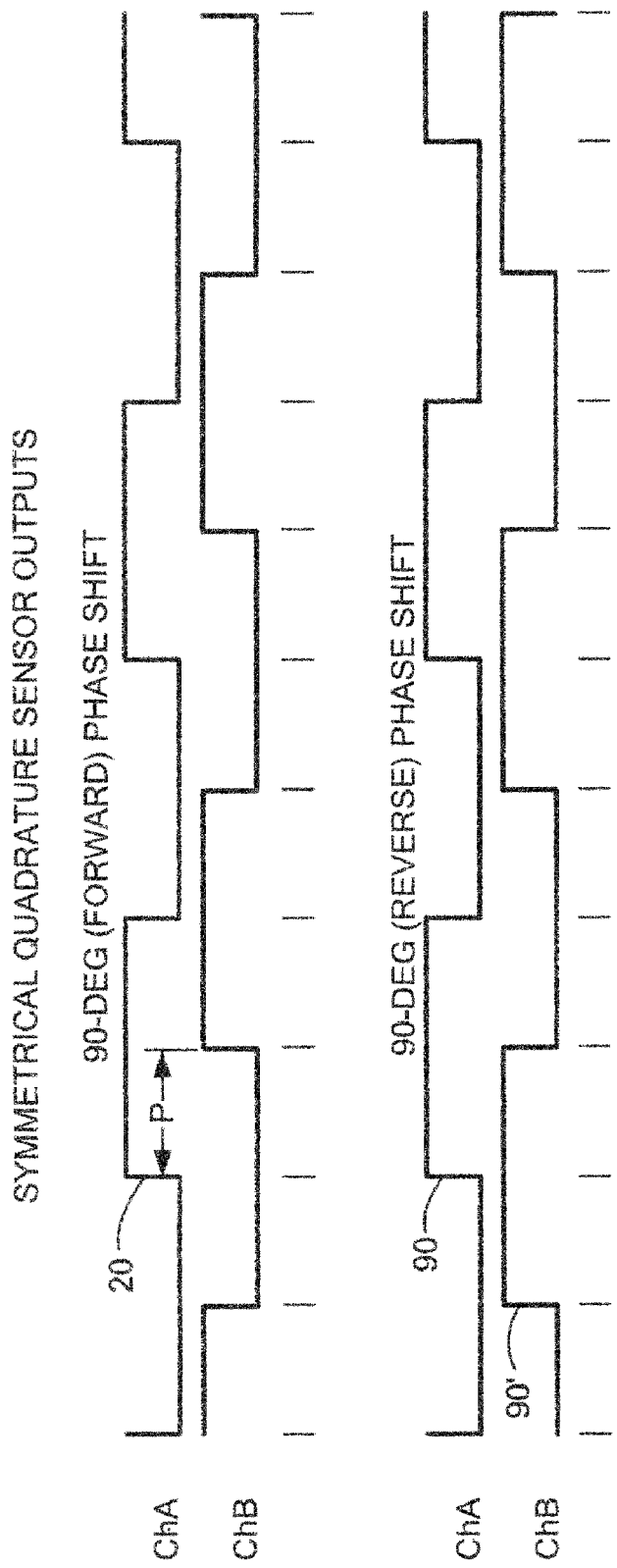
FIG. 7 is a wave form diagram of an output of a sensor and measurement thereof for a video surveillance system constructed in accordance with the principles of the present invention.

Now referring to FIG. 6, an operational block diagram illustrating an improved system and method for controlling the video surveillance system illustrated in FIGS. 3-5 is shown. In particular, the system includes the pan motor assembly 62 coupled to the pan platform 56 and/or portion of the housing assembly 52, such as housing element 55c for example, for movement of the camera assembly 54 in the horizontal (pan) axis through the motor/gear assembly 62. Although the illustration shows a pan platform for camera movement, the methods and approaches discussed in this illustration apply equally to motors and/or other components controlling tilt or other axes of movement. The pan encoder/sensor 62c may be attached directly to the motor shaft to maximize the frequency of edges available, thereby maximizing the accuracy of measured speed and position. The sensor 62c may output a plurality of signal edges on both Ch. A and Ch. B as shown in the waveform illustrated in FIG. 7.

The speed calculation may be performed by a speed converter 86 based on the output from a period decoder 88 indicating the detection of an edge 90, 90' on either output channel from the encoder 62c. In other words, the time period occurring between detection of a first edge on Ch. A and detection of a second edge on Ch. B may be correlated to a speed or revolution of the motor 62b, and thus motion of the camera assembly 54. This calculation may be based on speed being relative to 1/pulse width, for example. Using a measured period "P" between an edge of one quadrature channel output to the next edge of the other channel will yield four times as many speed updates as compared to simply using the period of one channel. Using this period calculation method and converting the period to speed results in updated speed data being available one or more magnitudes more often than with the previous technique of counting edges for a fixed period of time.

The converted speed measurement may then be compared to a speed input command 92 by the speed error calculator 94, which is then fed into a common PID algorithm of a PID controller 96, which may include a micro-controller, Digital-Signal-Processor ("DSP"), Field Programmable Gate Array ("FPGA") or other device capable of performing the PID calculations at a particular PID update frequency. The output of the PID calculation may be used to control the pulse width sent to the motor via a PWM driver 98. Of note, the controllers, converters, decoders and other processing elements discussed above may be integrated or otherwise embodied within either and/or both of the printed circuit/CPU boards 58, 84 described above. The system may also have a single controlling CPU. In addition, the hardware components described herein may also be contained within a ceiling mount engageable with a portion of the housing assembly and/or camera assembly.

Figure 8:
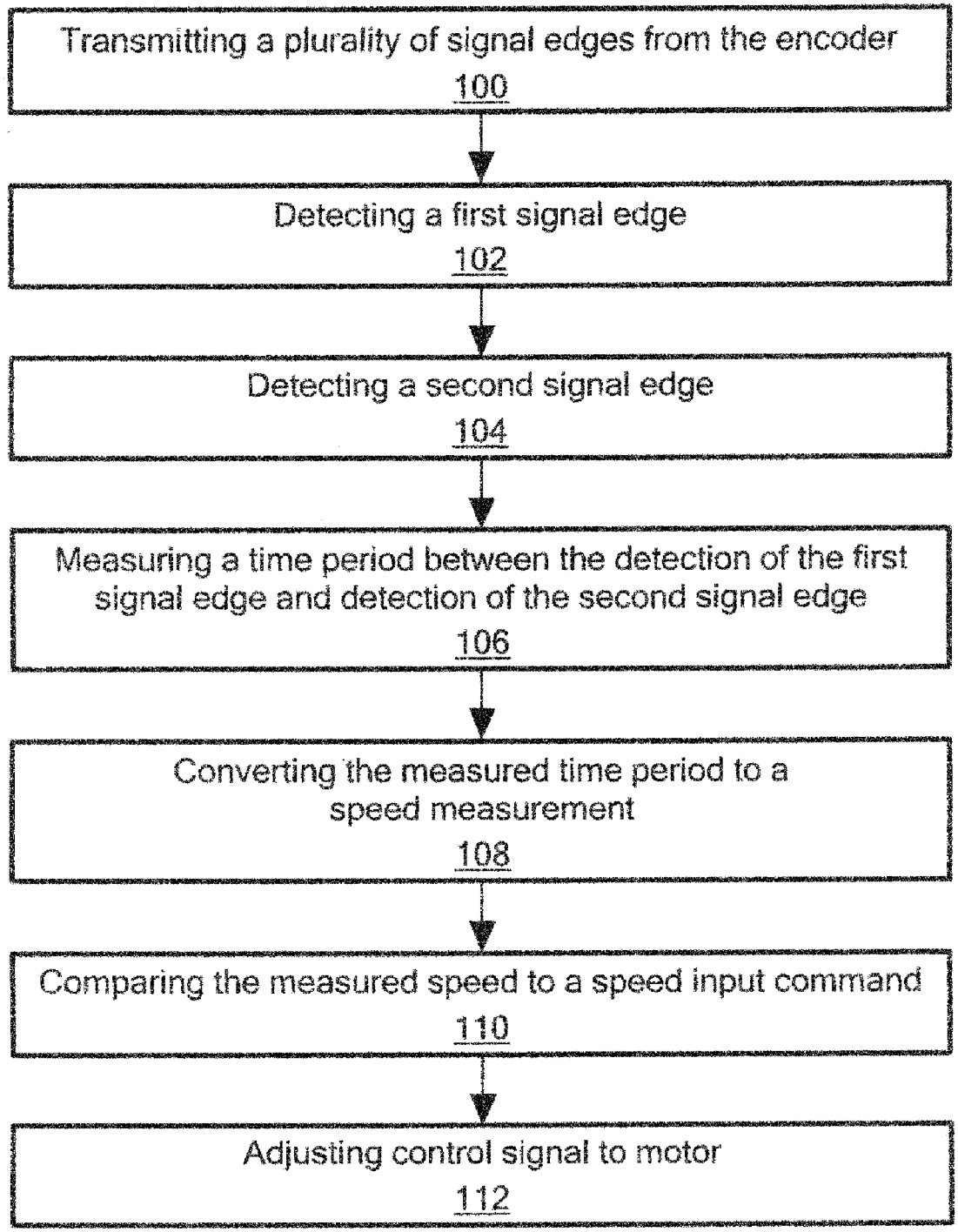
FIG. 8 is a flow chart of an exemplary method for controlling a video surveillance system in accordance with the present invention.

Now referring to the flow chart of FIG. 8, an exemplary method of motor and/or video surveillance system control is illustrated. The method generally includes the steps of transmitting a plurality of signal edges (Step 100) from an encoder coupled to a motor or gear assembly, as described above. From the plurality of transmitted signal edges, a first signal edge is detected (Step 102), and a second signal edge is detected (Step 104). The edges may be from the same and/or different channel outputs. A time period is subsequently measured between the detection of the first and second signal edges (Step 106). The measured time period between signal edges is then converted into a speed measurement of the motor or gear assembly, and thus the pan platform, housing, and or camera (Step 108). The converted speed measurement is then compared to a speed input command (Step 110), and a controlling signal to the motor may then be adjusted accordingly, for example, by the PID controller and/or PWM driver (Step 112).

In certain cases, using all four phases of the two encoder signals is not the optimal solution. For example, some encoders/sensors are not aligned perfectly, such that the two output signals do not have an exact 90° phase difference. Another source of error may be caused by a variation in the on-time versus off-time, i.e., duty cycle, of either or both channel signals. In other words, the two output signals may not be symmetrical, i.e., there may be a symmetry derivative or error between the high and low portions of the signal output such that the duty cycle is not substantially 50%.

Figure 9:
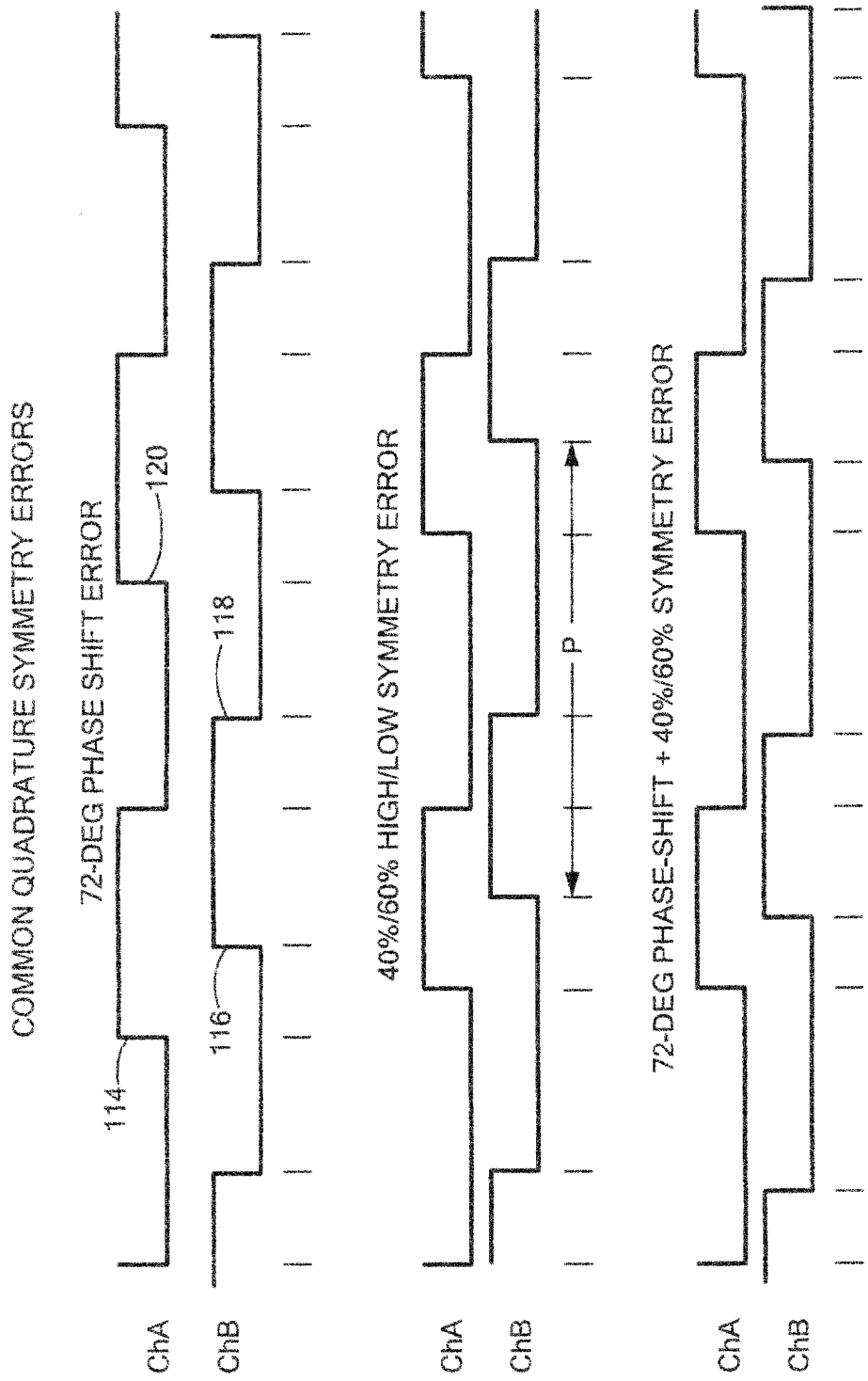
FIG. 9 is an additional wave form diagram of an output of a sensor of a video surveillance system in accordance with the principles of the present invention.

Exemplary waveforms for offset or otherwise out of phase channels are shown in FIG. 9. If the two channel outputs do not include an exact 90° phase difference, the difference results in the time between a signal edge 114 in Ch. A to the next edge 116 in Ch. B being different than the time from an edge 118 in Ch. B to an edge 120 in Ch. A when running at a constant speed. Differences in pulse widths or variations between high/low characteristics also results in a difference between sequential edge measurements. Both of these anomalies increase the difficulty in trying to derive speed from a single period measurement.

Nevertheless, even when quadrature sensors have these problems, a period measurement "p" from the rising edge of one channel to the next rising edge of the same channel is a very accurate period to derive speed from and is accommodated by the present invention. The use of a measurement of the first falling edge of one channel to the next falling edge of the same channel is just as accurate. In accordance with one embodiment, to reduce the maximum latency by ¼, the Ch. A rising-to-rising edge period, the Ch. A falling-to-falling edge period, the Ch. B rising-to-rising edge period and the Ch. B falling-to-falling edge period can be measured in parallel and the last calculation completed used for the current speed calculation. By measuring a complete period as each edge is detected, the most recent completed period calculation, whether from Ch. A rising edge to rising edge, Ch. B falling edge to falling edge, etc., significantly reduces the latency of speed updates regarding the performance of the motor as compared to existing systems.

In accordance with another embodiment, a variation of this same period measurement may include the use of a running average of the four subsections of a complete cycle when there are symmetry errors or differences between the high/low characteristics of either channel output. For example, when the segment between the rising edge of Ch. A and the rising edge of Ch. B is complete, it can be added to a running average of a plurality of previous measurements between the rising edge of Ch. A and the rising edge of Ch. B, and the previous measurement of the same segment could be subtracted.

The speed calculation method of the present invention allows for the optimization of controlling motors at very low speeds. Another benefit to quadrature period measurement for video camera control is that measurements at low speed have more resolution than measurements at high speed. Counting edges during a fixed time yields just the opposite, in that measurements at high speeds have more resolution than those at low speed. For example, performing the PID calculations at an exemplary 35 KHz rate of the PWM gives the system at least a magnitude faster feedback when the speed changes as compared to existing systems. In a video surveillance system, going to targets at high speed creates a video blur and as such, customers will not notice a 10-20% error. However, when manually controlling at low speeds, 10-20% variations in speed could result in unsatisfactory motion stability and/or visibility inaccuracies.

The control system may further include the storage and comparison of sequential measured periods between edges. For example, the control system may store a measured period between a first and second edge, as well as a measured period between the second edge and a third edge. The two measurements may be compared, and when the period measurement in progress, i.e., between the last quadrature edge and the next edge, exceeds the period between the last edge and the one before it, the period measurement may be continually updated by the period decoder until the next edge is detected. This provides an early indication of a potential or forthcoming stall in the motor as represented by large differences in sequential period measurements. When it is known that the period being measured is longer than the previous period, it is more accurate to dynamically use the increasing width of the pulse to derive a speed error for use by the PID controlling the motor. The conversion from period to speed and the calculation of speed error may be made initially at the start of a PID calculation sequence.

Combining these techniques allows the PID to compensate for a slight slowdown in speed (increased period) within a 35 KHz calc period. It has been found that DC motors used in the present invention can be controlled at $\frac{1}{10}$th of the speed than might otherwise be possible with the same mechanical system. This approach is advantageous because bearings and gears are not perfect and the lubricant may not be perfectly distributed and consistent, etc. For real world applications, this unique solution has a distinct advantage when controlling a motor at extremely slow speeds.

The systems and methods of the present invention provide for the improved, low speed control of a video surveillance system, with lower latency and quicker updating capacity as compared to existing systems. The improved system and methodology are readily implemented at a lower cost as compared to changing or modifying gear assemblies or motors which, as described above, are not without their own drawbacks.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A motor control system, comprising:
    a first encoder outputting a plurality of signals having corresponding signal edges, the plurality of signals including a first edge and a second edge and being based on speed of a first motor, the plurality of signals including a first channel signal and a second channel signal, the first edge being part of the first channel signal and the second edge being part of the second channel signal; and
    a first controller in electrical communication with the first encoder, the first controller determining a speed of the first motor at least in part by correlating a time period between detection of the first edge and detection of the second edge to the speed of the first motor.

2. The motor control system of claim 1, wherein the first controller determines a proportional-integral-derivative calculation for a pulse width modulated signal output to the first motor.

3. The motor control system of claim 2, wherein the first controller determines a first period measurement between detection of the first edge and detection of the second edge.

4. The motor control system of claim 3, wherein the plurality of signals having corresponding signal edges includes a third edge and a fourth edge, and wherein the first controller determines a change in the speed of the first motor at least in part by comparing a second period measurement between detection of the third edge and detection of the fourth edge to the first period measurement.

5. The motor control system of claim 3, wherein the plurality of signals includes a first channel signal and a second channel signal, each channel signal defining a rising signal pulse edge and a falling signal pulse edge, the speed determination being based at least in part on a time between (a) a rising signal pulse edge and a next rising signal pulse edge on the first channel signal, (b) a rising signal pulse edge and a next rising signal pulse edge on the second channel signal, (c) a falling signal pulse edge and a next falling signal pulse edge on the first channel signal, and (d) a falling signal pulse edge and a next falling signal pulse edge on the second channel signal.

6. The motor control system of claim 5, wherein the times for (a), (b), (c) and (d) are measured in parallel, and wherein the last of completed measurement of (a), (b), (c) and (d) is used to determine the speed.

7. The motor control system of claim 1, wherein the speed determination includes correlating a time period between detection of the first edge and detection of the second edge.

8. The motor control system of claim 1, further comprising:
a second encoder outputting a plurality of signals having corresponding signal edges, including a third edge and a fourth edge and being based on a speed of a second motor; and
a second controller in electrical communication with the second encoder, the second controller determining a speed calculation of the second motor by correlating a time period between detection of the third edge and detection of the fourth edge to the speed of the second motor.

9. The motor control system of claim 1, wherein the plurality of signals correspond to the speed of a camera positioning motor.

* * * * *